United States Patent
Sprainis et al.

(10) Patent No.: US 9,562,582 B2
(45) Date of Patent: Feb. 7, 2017

(54) COMPRESSIBLE ELASTOMERIC SPRING

(75) Inventors: Ronald J. Sprainis, Springfield, OR (US); Peter Gregar, Chesterton, IN (US)

(73) Assignee: Wabtec Holding Corp., Wilmerding, PA (US)

( * ) Notice: Subject to any disclaimer, the term of this patent is extended or adjusted under 35 U.S.C. 154(b) by 959 days.

(21) Appl. No.: 13/233,270

(22) Filed: Sep. 15, 2011

(65) Prior Publication Data
US 2013/0069292 A1   Mar. 21, 2013

(51) Int. Cl.
F16F 1/36   (2006.01)
F16F 1/373  (2006.01)
F16F 1/40   (2006.01)

(52) U.S. Cl.
CPC .............. F16F 1/3732 (2013.01); F16F 1/40 (2013.01); *Y10T 29/49826* (2015.01); *Y10T 403/70* (2015.01)

(58) Field of Classification Search
CPC .................................. F16F 1/3732; F16F 1/40
USPC .............................. 267/153, 293, 294, 69, 70
See application file for complete search history.

(56) References Cited

U.S. PATENT DOCUMENTS

| | | |
|---|---|---|
| 1,039,773 A | 10/1912 | McLarn |
| 1,772,414 A | 8/1930 | Brook-Hunt et al. |
| 2,486,741 A | 11/1949 | Gabriel |
| 2,553,635 A | 5/1951 | Dath |
| 2,553,636 A | 5/1951 | Dath |
| 2,713,485 A | 7/1955 | Tillou |
| 2,726,080 A | 12/1955 | Withall |
| 2,810,485 A | 10/1957 | Housman |
| 2,982,536 A | 5/1961 | Kordes |
| 3,279,048 A | 10/1966 | Grove et al. |
| 3,290,919 A | 12/1966 | Malinak et al. |
| 3,311,331 A | 3/1967 | Steimen |
| 3,602,465 A | 8/1971 | Velut |
| 3,637,088 A | 1/1972 | Bremond |
| 3,677,535 A | 7/1972 | Beck |
| 3,684,271 A | 8/1972 | Arthur |
| 3,929,729 A | 12/1975 | Chung |
| 3,984,125 A | 10/1976 | Paton et al. |
| 4,198,037 A * | 4/1980 | Anderson ..................... 267/153 |
| 4,566,678 A * | 1/1986 | Anderson ................. 267/141.1 |

(Continued)

FOREIGN PATENT DOCUMENTS

| | | |
|---|---|---|
| DE | 1993283 | 9/1968 |
| DE | 2944669 | 5/1981 |

(Continued)

*Primary Examiner* — Vishal Sahni
(74) *Attorney, Agent, or Firm* — The Webb Law Firm

(57) ABSTRACT

A compressible spring includes a substantially solid body defining a central axis and manufactured from an elastomeric material. A substantially solid abutment upstands axially on one end of the substantially solid body. There is also a lip that is disposed on a distal end of the axial abutment in a plane being substantially transverse to the central axis. An axial bore may be provided extending through the thicknesses of the body and abutment. Furthermore, a plate shape member may be provided that is mechanically secured to the substantially solid body during the forming process, wherein the abutment is passed through a central aperture in the rigid member and wherein the lip cages a thickness portion of the rigid member around the central aperture.

10 Claims, 6 Drawing Sheets

(56) References Cited

U.S. PATENT DOCUMENTS

| | | | |
|---|---|---|---|
| 4,591,059 A | | 5/1986 | Hammarlund |
| 4,822,671 A | * | 4/1989 | Carper et al. .................... 428/33 |
| 4,997,171 A | | 3/1991 | Toms, Jr. |
| 5,014,967 A | | 5/1991 | Wolf et al. |
| 5,104,101 A | | 4/1992 | Anderson et al. |
| 5,335,403 A | * | 8/1994 | Jensen ....................... 29/896.91 |
| 5,351,844 A | | 10/1994 | Carlstedt |
| 5,431,260 A | | 7/1995 | Gross et al. |
| 6,386,461 B1 | | 5/2002 | Wildgoose |
| 6,478,173 B2 | | 11/2002 | Carlstedt |
| 6,520,360 B1 | | 2/2003 | Withall et al. |
| 6,792,871 B2 | | 9/2004 | O'Donnell et al. |
| D524,338 S | | 7/2006 | Sims |
| 7,258,243 B2 | | 8/2007 | Ring et al. |
| 7,338,034 B2 | | 3/2008 | Aspengren et al. |
| 7,360,756 B2 | * | 4/2008 | Urquidi et al. ............... 267/293 |
| 7,624,884 B2 | | 12/2009 | Palermo et al. |
| 8,336,209 B2 | * | 12/2012 | Sprainis et al. .......... 29/896.93 |
| 2006/0043662 A1 | | 3/2006 | Blake, III |
| 2008/0272080 A1 | | 11/2008 | Sprainis et al. |
| 2008/0284077 A1 | * | 11/2008 | Sprainis et al. .......... 267/141.1 |
| 2009/0308829 A1 | * | 12/2009 | Sprainis et al. ............ 213/32 C |

FOREIGN PATENT DOCUMENTS

| | | |
|---|---|---|
| EP | 0971401 | 1/2000 |
| GB | 640838 | 7/1950 |
| GB | 752962 | 7/1956 |
| SU | 777278 | 11/1980 |
| SU | 894258 | 12/1981 |
| SU | 1490338 | 6/1989 |
| SU | 1670225 | 8/1991 |
| SU | 1719741 | 3/1992 |

* cited by examiner

COMPRESSIBLE ELASTOMERIC SPRING

CROSS-REFERENCE TO RELATED APPLICATIONS

This application closely related to co-pending U.S. Ser. No. 13/233,231 entitled "Elastomeric Draft Gear For Railcar". This application is being assigned to the assignee of the present invention and the disclosure of this co-pending application is hereby incorporated by reference thereto.

This application is further closely related to U.S. Ser. No. 12/150,809 entitled "Compressible Elastomeric Spring", to U.S. Ser. No. 12/150,928 entitled "Elastomeric Pad For A Compressible Elastomeric Spring", to U.S. Ser. No. 12/150,929 entitled "Method of Making Compressible Elastomeric Spring", to U.S. Pat. No. 7,981,348 issued Jul. 19, 2011, to U.S. Ser. No. 12/150,926 entitled Plate For a Compressible Spring. These applications are assigned to the assignee of the present invention and the disclosures of these applications are hereby incorporated by reference thereto.

FIELD OF THE INVENTION

The present invention relates, in general, to compressible elastomeric springs for absorbing and dissipating energy and, more particularly, this invention relates to compressible elastomeric springs for at least absorbing and dissipating energy during operation of a passenger or freight railcar and, yet more particularly, the instant invention relates to an elastomeric compressible spring having a novel arrangement for attaching elastomeric pads to plate shaped members axially disposed in series with each other.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND OF THE INVENTION

Prior to conception and design of the instant invention, efforts have been made to improve elastomeric springs particularly employed in the draft gear assemblies for cushioning buff and draft dynamic impact forces encountered during make-up and operation of a railway vehicle. While various prior art disclosures, including the disclosures of cross-referenced related applications, describe such various improvements to the elastomeric springs, it has been found that additional improvements are required in the area of attaching the elastomeric pad to a plate shaped member so as to improve symmetry of the elastomeric pad and to allow for substantially equal compression of each elastomeric pad when plurality of such elastomeric pads and plate shaped members are arranged serially within a spring stack.

SUMMARY OF THE INVENTION

According to one aspect, the invention provides a compressible spring. The compressible spring includes an elastomeric pad having a substantially solid body defining a central axis and manufactured from an elastomeric material. A substantially solid abutment upstanding axially on one end of the substantially solid body. There is a lip that is disposed on a distal end of the axial abutment in a plane being substantially transverse to the central axis. The spring can also include an axial bore extending through the thicknesses of the body and abutment. Equally as well, the spring may include a rigid, plate shape member that is mechanically secured to the elastomeric pad during the forming process, wherein the abutment is passed through a central aperture in the rigid member and wherein the lip cages a thickness portion of the rigid member around the central aperture.

In accordance with another aspect, the plurality of pads and rigid members are interposed in series with each other to define a spring stack.

In accordance with a yet another aspect, the invention provides a method of manufacturing a compressible elastomeric spring. The method includes the step of providing a substantially solid unitary, one-piece preform body including a predetermined cross-section disposed normal to a central axis of the preform body, a pair of spaced apart axial ends defining thickness of the preform body, each of the pair of axial ends having each of a generally flat surface disposed normal to the central axis, an axial substantially solid abutment upstanding on one of the pair of axial ends and an axial bore formed though each of the thickness of the substantially solid body and a thickness of the substantially solid abutment. Then, providing a pair of forming members, at least one of the pair of forming members having a material displacement means at least one of disposed integral with and secured to one surface thereof. Next, positioning the substantially solid preform body between the pair of forming members. Inserting the material displacement means into the axial bore. Finally, applying axial force to at least one of the pair of forming members.

OBJECTS OF THE INVENTION

It is, therefore, one of the primary objects of the present invention to provide a novel elastomeric pad for a compressible elastomeric spring.

Another object of the present invention is to provide a novel elastomeric pad for a compressible elastomeric spring that includes an axial lip disposed on one end of the pad so as to cage a thickness portion of a plate shaped member.

Yet another object of the present invention is to provide a novel elastomeric pad for a compressible elastomeric spring that includes an axial bore.

A further object of the present invention is to provide an elastomeric spring utilizing a plurality of the above described elastomeric pads secured to plate shaped members so as to form a spring stack.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
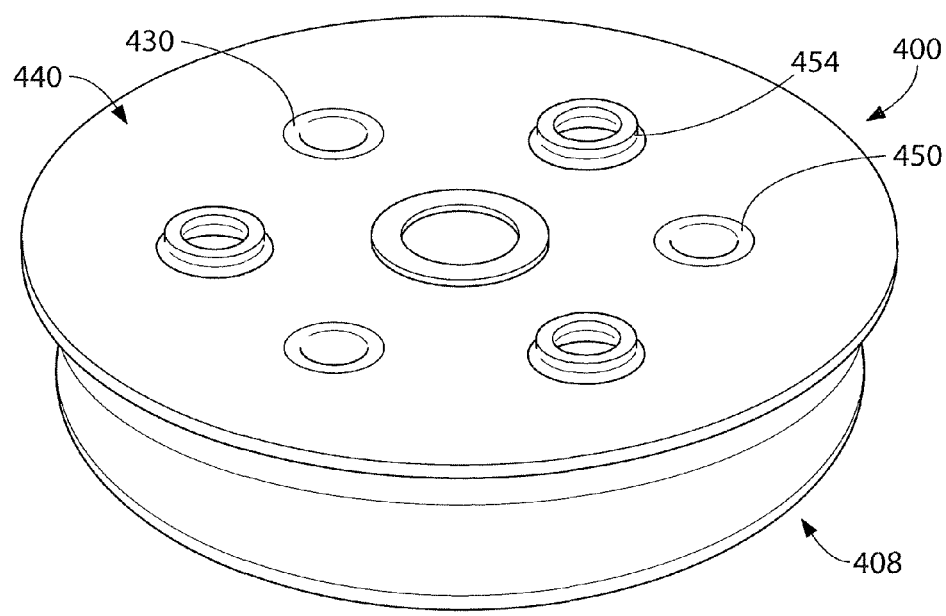
FIG. 1 is a perspective view of an elastomeric spring.

Prior to proceeding to the more detailed description of the present invention, it should be noted that, for the sake of clarity and understanding, identical components which have identical functions have been identified with identical reference numerals throughout the several views illustrated in the drawing figures.

Figure 2:
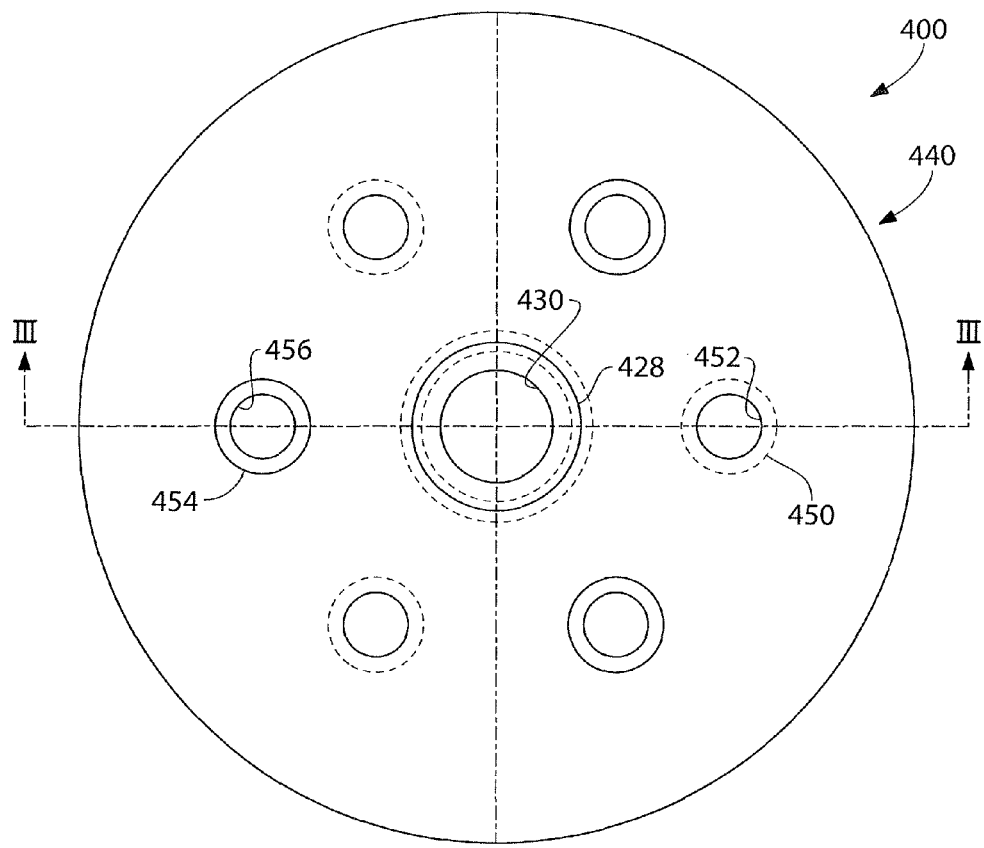
FIG. 2 is a planar view of the elastomeric spring of FIG. 1.
Figure 3:
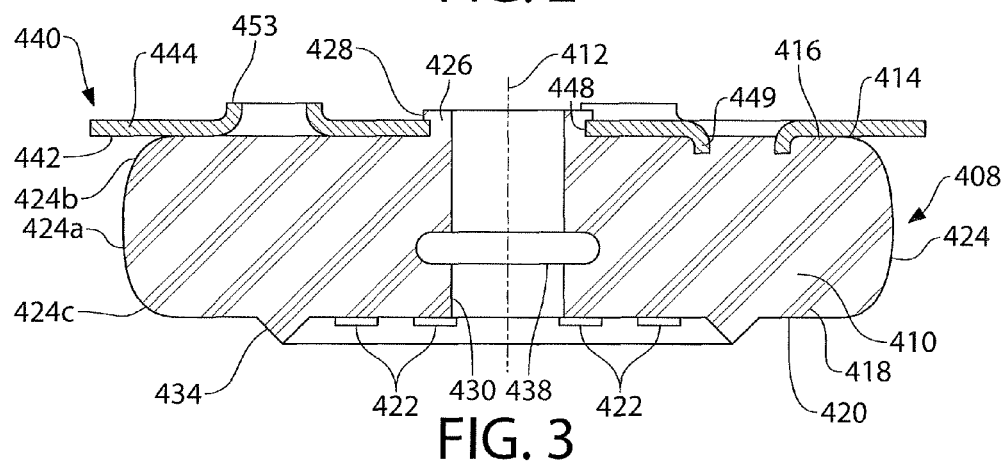
FIG. 3 is a cross-sectional elevation view of the elastomeric spring along lines III-III of FIG. 2.

Reference is now made, to FIGS. 1-3, wherein there is shown a compressible spring, generally designated as 400. Such compressible spring 400 includes an elastomeric compressible member, generally designated as 408, and commonly referred to as a pad. The pad 408 includes a substantially solid body 410 defining a central axis 412. The central axis 412 also defines central axis of the compressible spring 400. The substantially solid body 410 defines a first axial end 414 having a first end surface 416 disposed in a first plane being generally transverse to the central axis 412. A second axial end 418 of the substantially solid body 410 has a second end surface 420 disposed in a second plane being generally transverse to the central axis 412. The second end surface 420 is spaced apart from the first end surface 416 along the central axis 412. A distance between the first and second end surfaces, 416 and 420 respectively, along the central axis 412 defines a thickness of the substantially solid body 410. The end surfaces 416 and 420 are preferably substantially planar but may include deviations such as depression(s) and protrusion(s). An outwardly curved peripheral surface 424 joins the first and second axial ends 414 and 418 respectively to complete the basic conventional shape of the substantially solid body 410. The peripheral surface 424 in the instant invention is defined by a middle region 424a and a pair of end regions 424b and 424c, each having a smaller radius than the radius of the middle region 424a. It is not necessary for the end regions 424b and 424c to be identical to each other, wherein the radius of the end region 424c disposed at the second axial end 418 is smaller than the radius of the end region 424b. However, it is presently contemplated that the radii of such end regions 424b and 424c are sized substantially close to each other so as to provide for a substantial symmetry of the peripheral surface 424 in a plane substantially parallel to the plane having the central axis 412 disposed therein. Such substantial symmetry has been found advantageous in uniform compression of the elastomeric pad 408 along the central axis 412.

Another essential element of the pad 408 is a substantially solid abutment 426 upstanding axially on one end of the substantially solid body 410, referenced with numeral 414 in FIG. 2. More specifically, the substantially solid abutment 426 upstands on the end surface 416 of such axial end 414. In the presently preferred embodiment of the invention, the substantially solid abutment 426 has a generally round cross-section in a plane being substantially transverse to the central axis 412 and further has each of a substantially uniform thickness and substantially uniform diameter throughout.

Yet another essential element of the pad 408 is a peripheral lip 428 which is disposed on a distal end of the substantially solid abutment 426 in a plane being substantially transverse to the central axis 412. It would be understood that the peripheral lip 428 has an annular shape in the plane being substantially transverse to the central axis 412.

The final essential element of the pad 408 is an axial bore 430 that is formed through the thickness of the substantially solid body 410 and through the thickness of the substantially solid abutment 426.

The criticality of the lip 428 and the axial bore 430 will be explained further in this document.

The substantially solid body 410 may define an optional projection or a ridge 434 disposed axially on an opposite axial end of the substantially solid body 410, referenced with numeral 418 in FIG. 2. The ridge 434 may be provided in sections, continuous or endless and, preferably, has an annular shape. Furthermore, the annular ridge 434 has a generally triangular cross-section in a plane being substantially parallel to a plane of the central axis 412, whereby a base of the generally triangular cross-section lies on an end surface 420 of the opposite axial end 418.

A second optional projection or annular ridge 436 may be provided on the axial end 414 in combination with the substantially solid abutment 426 and may be further provided in combination with peripheral lip 428.

In the instant invention, the pad 408 is manufactured as a unitary, one-piece member including the substantially solid body 410, the substantially solid abutment 426, peripheral lip 428 and the annular ridge 434.

The material of such pad 408 is an elastomer, and more specifically, a thermoplastic elastomer that has been modified from the original virgin material in the early stages of the manufacturing process. As has been taught in the U.S. Ser. No. 12/150,928 entitled "Elastomeric Pad For A Compressible Elastomeric Spring", incorporated by reference herein, the thermoplastic elastomer material prior to being modified is a copolyester polymer. Such copolyester polymer may of the type as manufactured by E.I. DuPont de Nemours & Co. of Wilmington, Del. under the general HYTREL trademark or DSM Plastics of Heerlen, NL under the general Arnitel brand.

In further reference to FIGS. 1-3, the compressible spring 400 also includes at least one rigid member, generally designated as 440. The at least one rigid member 440 is essentially a plate shaped member having a pair of substantially planar surfaces 442 and 444, spaced apart from each other along the central axis 412 to define a thickness of the at least one rigid member 440. One of the pair of substantially planar surfaces, referenced with numeral 442, is positioned in direct contact with essentially the entire end surface 416 of the one axial end 414 of the substantially solid body 410. A central aperture 448 is formed through the thickness of the at least one rigid member 440 and is so sized that the axial abutment 426 is received operatively therewithin. Term "operatively" means herein that the axial abutment 426 is allowed to pass through the central aperture 448 so that the distal end of the axial abutment 426 extends a predetermined distance beyond an opposite one of the pair of substantially planar surfaces, referenced with numeral 444, of the at least one rigid member 440. More importantly, a thickness portion of the at least one rigid member 440 around the peripheral edge of the central aperture 448 is being caged between one of the end surface 416 of the axial end 418 of the substantially solid body 410 and an inner surface of the peripheral lip 428, as best shown in FIG. 3.

The at least one rigid member 440 further includes a plurality of protrusions 449 upstanding in a predetermined pattern on the one of the pair of substantially planar surfaces, referenced with numeral 442 of the at least one rigid member 440 and a plurality of apertures 452 formed through the thickness of the at least one rigid member 440 and the protrusions 449 so as to define an annular shaped members or ring 450. As it further shown in FIG. 2, there is at least partial penetration by each of the plurality of rings 450 of the at least one rigid member 440 into the thickness of the substantially solid body 410.

It is also presently preferred to provide an additional plurality of protrusions 453 upstanding in a predetermined pattern on the opposite one of the pair of substantially planar surfaces, referenced with numeral 444 of the at least one rigid member 440 and an additional plurality of apertures 456 formed through the thickness of the at least one rigid member 440 and protrusions 453 and defining annular shaped members or ring 454.

Preferably, the rings 450 and 454 are identical to each other and are interposed with each other in a circular pattern relative to the central axis 412.

It has been also found that apertures 452 and 456 without the protrusions 449 and 453 are sufficient in some applications to provide both the mechanical fastening of the plate 440 and pad 408 and a barrier or restriction to radial expansion and contraction of the elastomeric pad 408 during corresponding compression and release of the spring 400.

In the instant invention, the peripheral lip 428 caging the thickness portion around the peripheral edge of the central aperture 448 of the at least one rigid member 440 provides novel means for securing the compressible elastomeric body 410 to the at least one rigid member 440. It has been found that a substantially small thickness of such lip 428 does not require offset of such thickness portion relative to the remaining portion of the at least one rigid member 440 prior to attachment of the solid body 410 thereto. Additional securing means is provided by penetration of each of the plurality of rings 450 of the at least one rigid member 440 into the thickness of the substantially solid body 410 and/or by any other conventional means.

Figure 4:
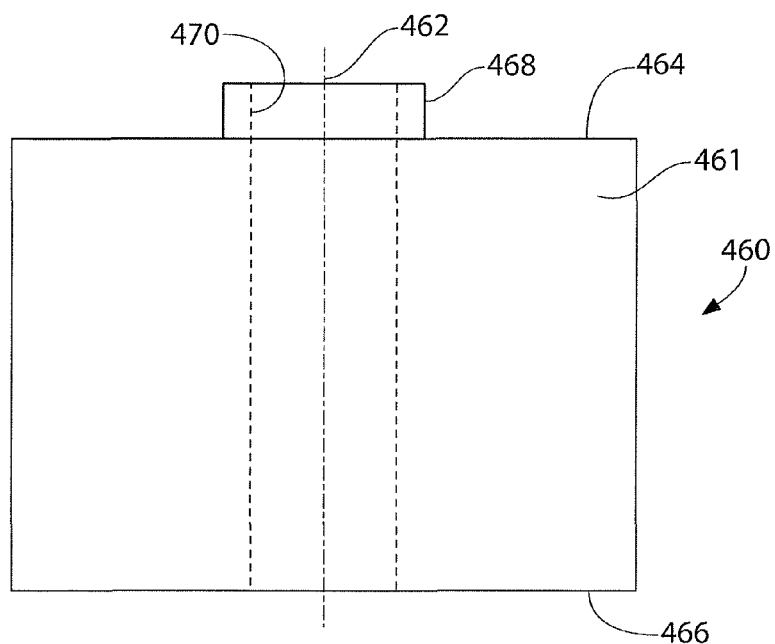
FIG. 4 is an elevation view of a preform employed in manufacturing the elastomeric spring of FIGS. 1-3.

The presently preferred method of manufacturing (or forming) above-described compressible elastomeric spring 410 includes the step of providing a unitary, one-piece preform, generally designated as 460, including a substantially solid body 461 having a predetermined cross-section disposed normal to a central axis 462 of the preform 460. It is presently preferred that such predetermined cross-section is substantially round and the diameter of such substantially solid body 461 is sized slightly smaller than the diameter of the resulting annular ridge 434 at a pick portion thereof. A pair of spaced apart axial ends 464, 466 defines thickness of the preform body 461. Each of the pair of axial ends 464, 466 has a generally flat surface disposed normal to the central axis 462. An axial substantially solid abutment 468 upstands on one of the pair of axial ends, referenced with numeral 464 in FIG. 4. An axial bore 470 is formed though each of the thickness of the preform body 461 and a thickness of the substantially solid abutment 468. The axial bore 470 has a substantially uniform diameter throughout its length.

Figure 5:
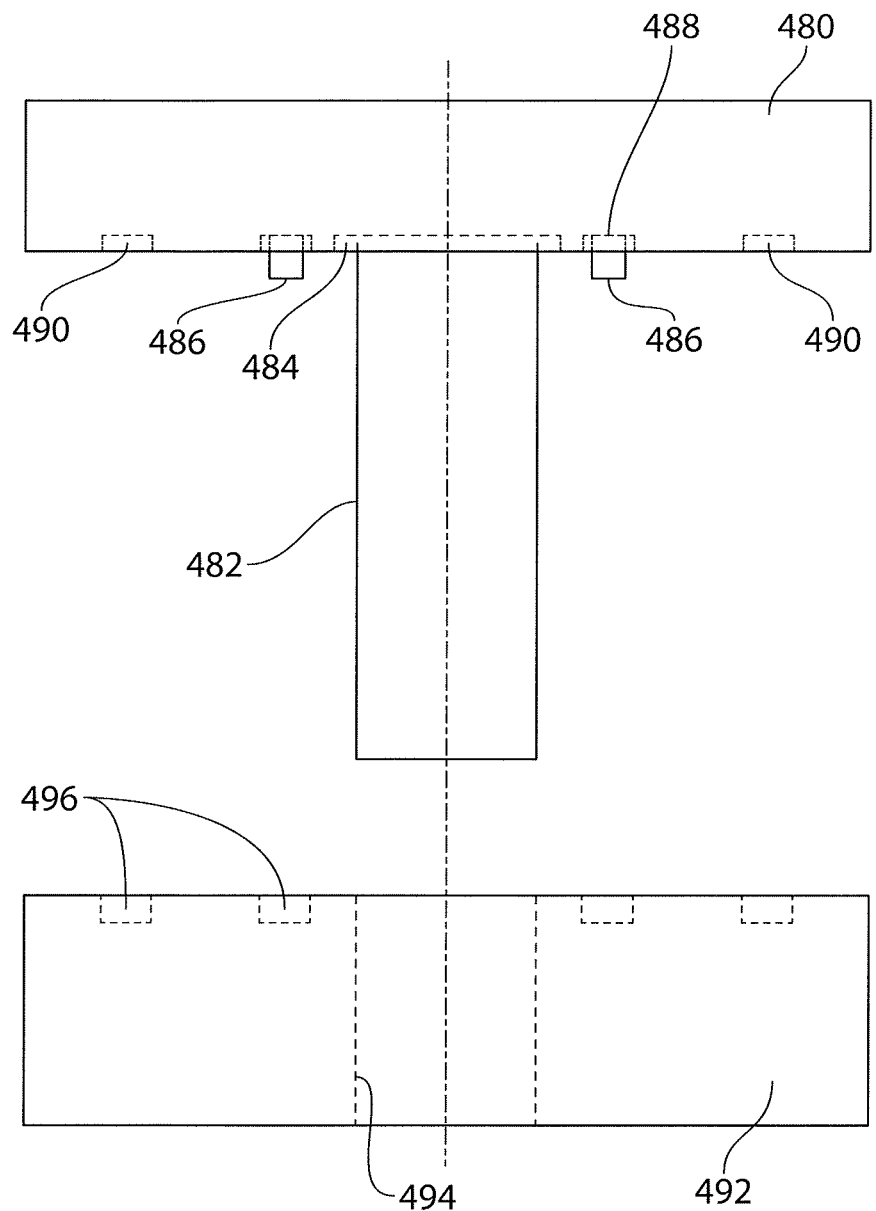
FIG. 5 is an elevation view of forming plates employed in forming the spring of FIGS. 1-3.

The method further includes the step of providing an assembly including a pair of forming members 480 and 492, an elongated member, such as rod 482, having one end thereof disposed on one of the pair of forming members, referenced with numeral 480 in FIG. 5, and recess 484 also provided in the forming member 480 coaxially with the elongated rod 482. The elongated rod 482 extends substantially perpendicular to the forming member 480 and defines central axis of the forming assembly. Next, the method includes the step of positioning the preform 460 between the pair of forming members 480 and 492. Then, the method includes the step of inserting the material displacement means 482 into the axial bore 470 and applying axial force to at least one of the pair of forming members. After the axial force is withdrawn, the preform 460 is formed into the above described pad 408. The diameter of the solid body 461 of the preform 460 is so selected that it overlaps the rings 450, as best shown in FIG. 2.

In the presently preferred form, the method includes an additional step of positioning the rigid member 440 on the axial end 464 having the abutment 468 disposed thereon prior to applying the axial force so as to mechanically interlock the rigid member 440 with the pad 408 by way of the peripheral lip 428 and further by penetration of each of the plurality of optional rings 450 of the rigid member 440 into the thickness of the substantially solid body 410. Advantageously, the recess 484 is so dimensioned that it forms the lip 428 during application of axial force. It would be understood that the substantially solid body 410 is the result of axially compressing the substantially solid preform body 461 of the preform 460. Thus, the pad 408 is precompressed during the forming process. The forming member 480 is adapted with a plurality of pins 486 mounted in positions to mate with the respective apertures 456 of the rings 454 so as to substantially center the rigid member 440 with the pad 408. The rings 454 fit into the bores 488 that are disposed axially with the pins 486. Optional magnets 490 may be imbedded within the surface of the forming member 480 so as to temporarily secure the rigid member 440, being manufactured from metal, such as steel. Furthermore, the opposite forming member 492 is adapted with a central bore (or aperture) 494 sized to receive the axially opposite end of the rod 482 for centering and guiding purposes, wherein such axially opposite end of the rod 482 moves reciprocally and linearly within the central bore 494.

In order to provide for substantial symmetry of the peripheral surface 424 in a plane substantially parallel to the plane having the central axis 412 disposed therein, it has been found critical to constrain the end 464 of the perform body 461. Accordingly, the instant invention contemplates a plurality of bores 496 provided within the surface of the opposite forming member 492 and sized so as to constrain the end 464 but allow for ease of separation of the elastomeric material of the formed body 410 from such opposite forming member 492 after the forming process has been completed. The instant invention anticipates that plurality of projections 422 will be defined on the surface 420 of the axial end 418 after such forming process and may be further defined on the annular ridge 434. The instant invention also anticipates that such bores 496 may be provided as apertures in a separate plate shaped member (not shown).

The forming method also provides for removing smoothness of the at least one surface of the rigid member 440 by any conventional method.

One of the advantages of the above described method and the resultant elastomeric pad 408 is that the axial bore 430 has a substantially uniform diameter throughout at least fifteen percent (15%) of its length. It is presently preferred to select the ratio between the diameters of the axial bore 470 and exterior diameter of the preform body 461 so that the resultant axial bore 430 has substantially uniform diameter through out of at least seventy five percent (75%) of its length, interrupted only by an axially disposed pocket 438.

Figure 6:
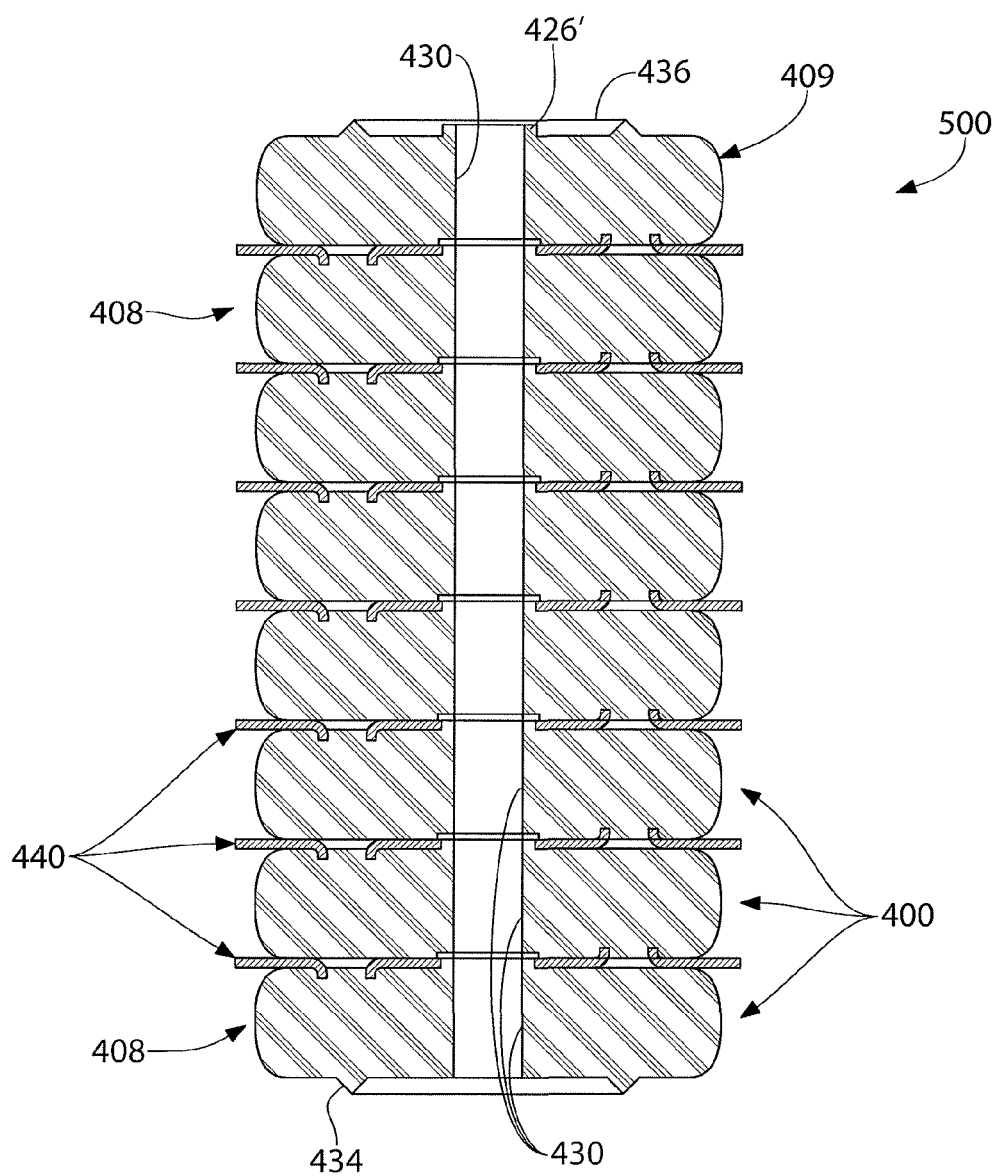
FIG. 6 is an elevation view of a spring stack employing the elastomeric springs of FIGS. 1-3.

Now in reference to FIG. 6, the instant invention further provides for plurality of elastomeric compressible springs 400, each including elastomeric pads 408 (shown without the cavity 438) and rigid member 440, to be axially disposed with each other and formed into a compressible elastomeric spring, generally designated as 500, preferably by application of another axial force. Such compressible elastomeric spring 500 is commonly known as a spring stack. During forming of the spring stack 500, the additional plurality of rings 454 will penetrate the thickness of the adjacently disposed pad 408, thus providing for a series of pads 408 and rigid members 440 mechanically interlocked with each other. In the presently preferred embodiment, the compressible elastomeric spring 500 also includes another pad, generally designated as 409, that is constructed generally similar to the pad 408, except that a second annular ridge 436 is provided on the same surface having the substantially solid abutment 426' disposed thereon. The abutment 426' is generally similar to the above described abutment 426 but may differ in length. Furthermore, such abutment 426' is preferably void of the peripheral lip 428.

In order to manufacture a homogeneous spring stack, it has been found necessary to align axial bores 430 prior to application of the axial force. It has been further found necessary to generally align, in an overlapping manner, the annual ridge 434 with the additional plurality of rings 454. More particularly, the diameter of the annular ridge 436 at its tip may be slightly smaller, equal to or slightly larger than the diameter of the circular pattern of the rings 454.

Term homogeneous is meant to define herein all compressible elastomeric pads 408, 409 compress substantially equally along the central axis 412, that each compressible spring 400 within the spring stack 500 dissipates substantially equal portion of the axial force applied to the end of the spring stack 500 and is meant to further define that all individual springs 400 have a substantially equal radial expansion (lateral stability) during application of such axial force. In other words, each compressible spring 400 operates substantially equally with the other compressible springs 400 within the spring stack 500 during compression and extension thereof.

However, it is within the scope of the instant invention to provide a spring stack 500 wherein at least one spring 400 is selected to operate differently from the remaining springs 400, for example by using a different material for such at least one compressible spring 400 or forming such at least one spring 400 from a different height perform or to a different precompressed rate.

Additional advantage of the above described spring stack 500 is in that the axial bores 430, disposed in series with each other, enable insertion of the elongated member (not shown) therethrough so as to properly align all compressible elastomeric springs 400 within the spring stack 500.

Figure 7:
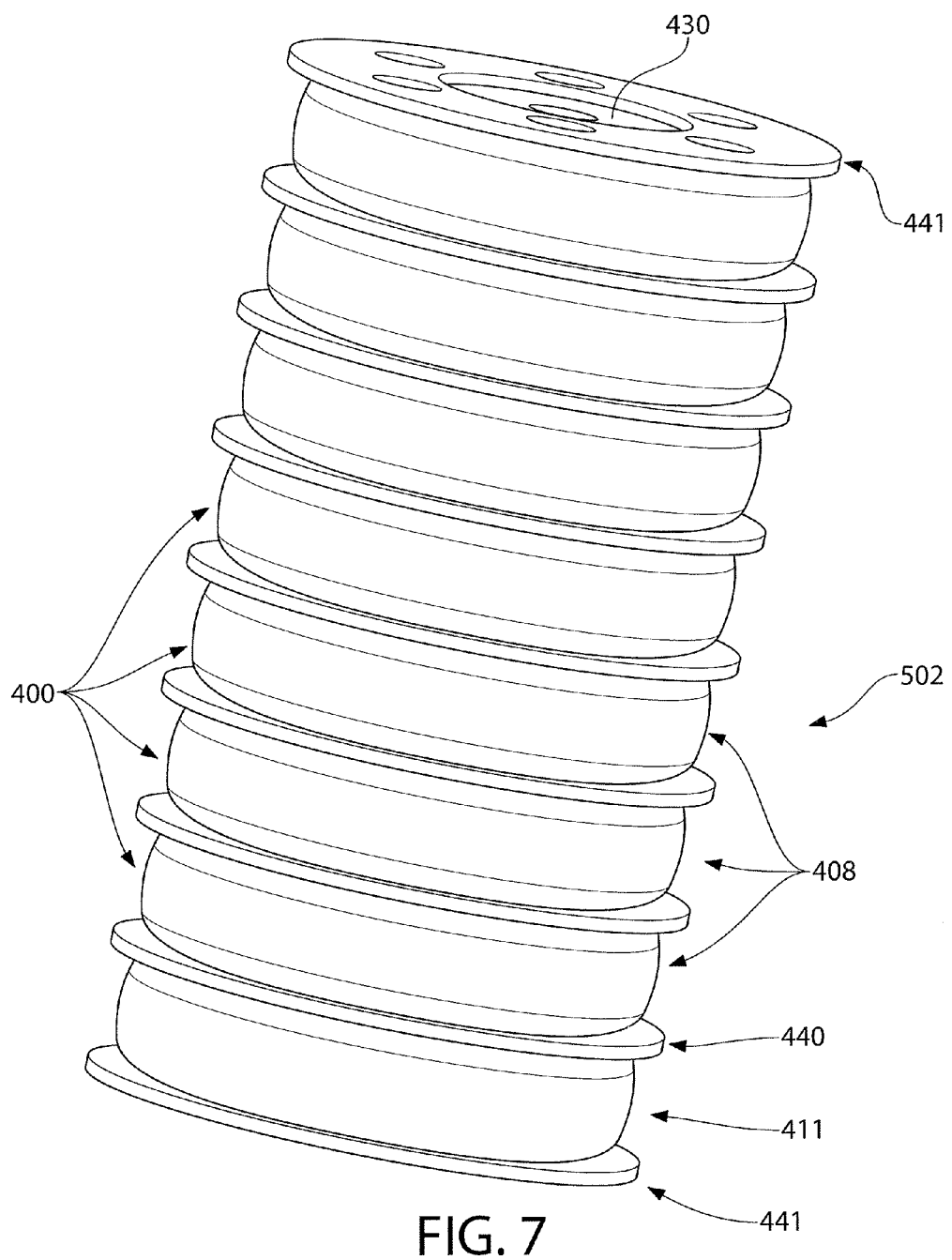
FIG. 7 is an elevation view of the spring stack of FIG. 6, particularly illustrating a pair of end plate shaped members.

Now, in a particular reference to FIG. 7, therein is illustrated a spring stack, generally designated as 502, which is essentially a spring stack 500 having a pair of end rigid members 441. In such form, one elastomeric pad, referenced with numeral 411 is adapted with a pair of abutment 426 and peripheral lips 428 for mechanical interlocking to a pair of the rigid members 440 and 441.

Figure 8:
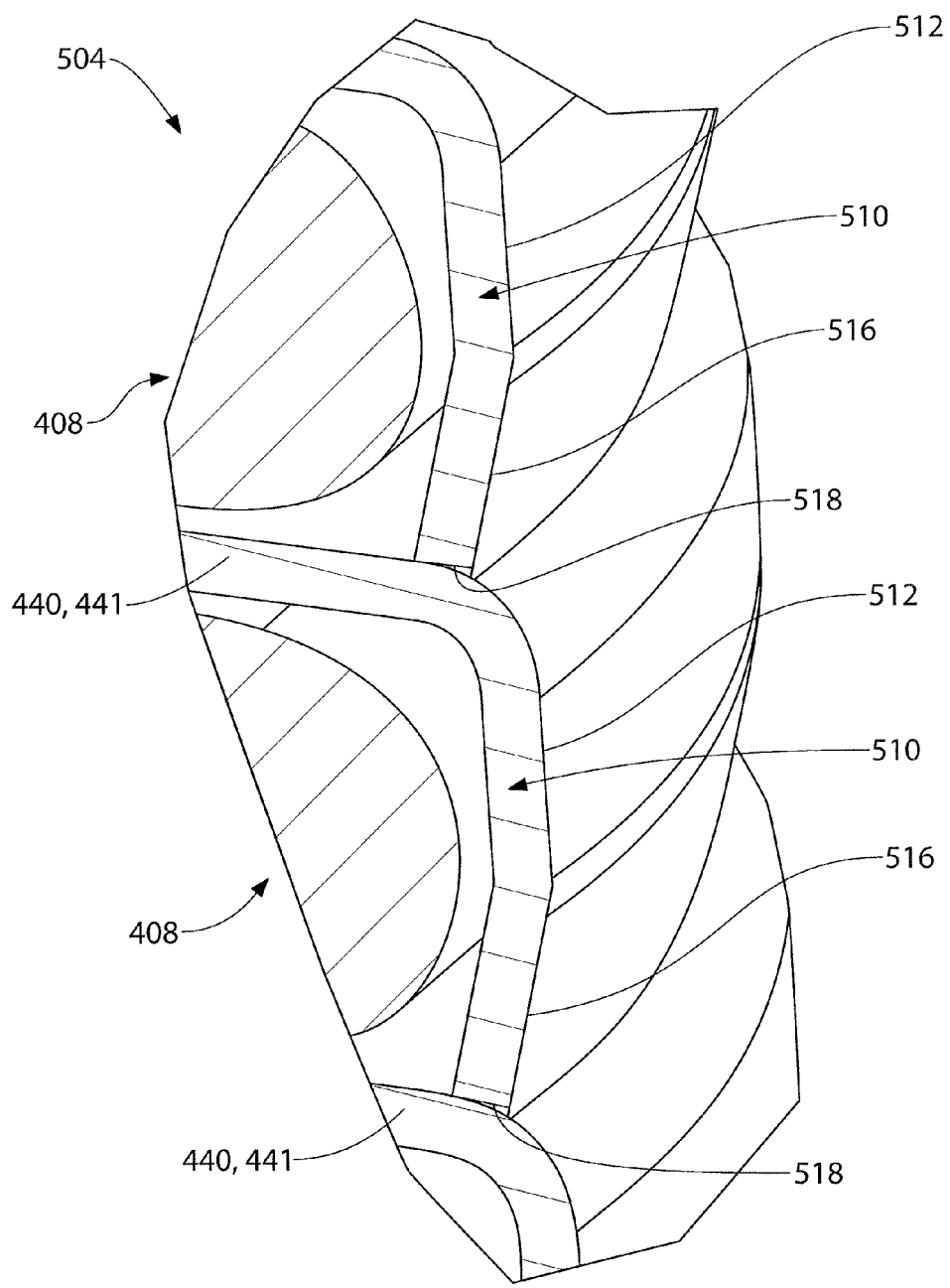
FIG. 8 illustrates a partial cross-sectional elevation view of the spring stack of FIG. 6, particularly illustrating solid stops on rigid plate shaped members disposed in series within the spring stack.

Finally, in a particular reference to FIG. 8, therein is partially illustrated a spring stack, generally designated as 504, which is essentially a spring stack 500 or 502 having means for limiting compression and subsequent radial expansion of each elastomeric pad 408. In accordance with a presently preferred embodiment, such means includes a peripheral flange 510 either rigidly attached to rigid members 440, 441 or formed integral therewith. Such peripheral flange 510 defines a first portion 512 that depends from one surface of the rigid members 440, 441 and has a substantially equal cross-section throughout. The means further defines a second portion 516 that terminates the first portion 512 and tapers inwardly toward the central axis 412. Conventionally, the first portion 512 has a substantially tubular shape and the second portion 516 has a generally frusto-conical shape. In operation the terminal edge 518 of the second portion 516 is sized to abut the surface of the rigid member 440, 441 during compression of the spring stack 504, thus limiting compression of the respective pad 408, disposed within the peripheral flange 510, to a predetermined height.

Although all rigid members 440 and 441 may be provided with the above described peripheral flange 510, it is contemplated that only a predetermined portion of rigid members 440, 441 within the spring stack 504 may be adapted with such peripheral flange 510. The rigid members 440, 441 having such peripheral flange 510 may be disposed next to each other or may be separated by rigid members 440, 441 absent any peripheral flange 510. This configuration is particularly preferred when the respective pads 408 are manufactured from a softer material than the remaining pads 408 and are prone to a greater compression and even overcompression when the axial force or load is applied along the central axis 412. Thus, in the spring stack 504 having such softer pads 408 positioned adjacent the end being closest to the axial force/load application, the softer pads 408 would be employed for absorbing lighter force/load conditions even, perhaps, substantially minimizing or eliminating contribution of remaining pads 408 and will be employed in combination with the remaining pads 408 for absorbing maximum force/load conditions. In other words, employment of pads 408 manufactured from at least two different materials affords control or tailoring of the spring rate and energy absorption in layers or segments of the spring stack 504. While, the peripheral flange 510 provides positive control of the pad 408 compression, the pads 408 of different materials may be employed without such peripheral flange 510.

After forming, the pad 408 also has its molecular structure oriented above seventy percent (70%) during the forming process and a predetermined shape factor achieved after the forming process enabling repetitive absorption and dissipation of dynamic impact loads in excess of one hundred thirty percent (130%) of ultimate tensile strength of such copolyester polymer material without the use of the friction cutch mechanism. It is to be understood that dynamic impact loads in excess of one hundred thirty percent (130%) of ultimate tensile strength means here that predetermined plurality of pads 408 and rigid 440 mechanically interlocked with each other repetitively absorb and dissipate the dynamic impact forces applied to the compressible elastomeric spring 400 along central axis thereof, wherein a ratio between a value of the applied dynamic impact forces and a value of an ultimate tensile strength of the predetermined or preselected material is greater than 1.3 to 1.

Although, the springs 400 and spring stacks 500, 502 and 504 have been described as having rings 450, 454, it is also contemplated that such rings may be replaced with prongs in accordance with teachings of the above-referenced applications incorporated by reference herein.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A compressible spring comprising:
   (a) a substantially solid body defining a central axis and manufactured from an elastomeric material;
   (b) a substantially solid abutment upstanding axially on one end of said substantially solid body; and
   (c) a lip disposed on a distal end of said axial abutment in a plane being substantially transverse to said central axis, wherein the compressible spring includes a ridge and wherein said ridge has an annular shape and is disposed axially on an opposite end of said substantially solid body, said annular ridge having a generally triangular cross-section in a plane being substantially parallel to a plane of said central axis, whereby a base of said generally triangular cross-section is disposed on an end surface of said opposite end.

2. A compressible spring comprising:
   (a) a substantially solid body defining a central axis and manufactured from an elastomeric material;
   (b) a substantially solid abutment upstanding axially on one end of said substantially solid body; and
   (c) a lip disposed on a distal end of said axial abutment in a plane being substantially transverse to said central axis, the compressible spring further comprising at least one rigid member, said at least one rigid member including:
      i. a pair of substantially planar surfaces spaced apart from each other along said central axis to define a thickness of said at least one rigid member, one of said pair of substantially planar surfaces abuttingly engaging an end surface of said one end of said substantially solid body;
      ii. a central aperture formed through a thickness of said at least one rigid member, said aperture is so sized that said axial abutment is received operatively therewithin;
      iii. wherein said distal end of said axial abutment extends a predetermined distance beyond an opposite one of said pair of substantially planar surfaces of said at least one rigid member; and
      iv. wherein a thickness portion of said at least one rigid member is being caged between said one of said end surface of said one end of said substantially solid body and an inner surface of said lip.

3. The compressible spring of claim 2, wherein said caged thickness portion is disposed planar with a remaining thickness portion of said at least one rigid member.

4. The compressible spring of claim 2, further including:
   (a) a plurality of projections upstanding in a predetermined pattern on said one of said pair of substantially planar surfaces of said at least one rigid member;
   (b) a plurality of apertures, each of said plurality of apertures formed through said thickness of said at least one rigid member and a thickness of a respective one of said plurality of projections and defining in combination, a ring shaped projection; and
   (c) penetration by each of a plurality of ring shaped projections of said at least one rigid member into a thickness of said substantially solid body.

5. A compressible spring comprising:
   (a) a substantially solid body defining a central axis and manufactured from an elastomeric material, said substantially solid body including;
      i. a first axial end of said substantially solid body having a first end surface disposed in a first plane being generally transverse to said central axis,
      ii. a second axial end of said substantially solid body having a second end surface disposed in a second plane being generally transverse to said central axis, said second end surface spaced apart from said first end surface along said central axis,
      iii. a thickness of said substantially solid body defined by a distance between said first and second end surfaces along said central axis, and
      iv. an outwardly curved peripheral surface joining said first and second axial ends;
   (b) an abutment upstanding axially on one of said first and second end surfaces, said abutment having each of a substantially uniform thickness and substantially uniform diameter throughout;
   (c) an axial bore formed through said thickness of said substantially solid body and through said thickness of said abutment; and
   (d) an annular ridge disposed axially on an opposite one of said first and second end surfaces, said annular ridge having a generally triangular cross-section in a plane being substantially parallel to a plane of said central axis, whereby a base of said generally triangular cross-section lies on said opposite one of said first and second end surfaces.

6. A compressible spring comprising:
   (a) a unitary, one-piece compressible elastomeric body defining a central axis and including:
      i. a first axial end having an end surface disposed in a first plane being generally transverse to said central axis,
      ii. a second axial end having an end surface disposed in a second plane being generally transverse to said central axis, said second end spaced apart from said first axial end along said central axis,
      iii. a thickness of said compressible elastomeric pad defined by an axial distance between said first and second axial ends,
      iv. an outwardly curved peripheral surface joining said first and second axial ends,
      v. an abutment upstanding axially on said end surface of one of said first and second axial ends,
      vi. an axial bore formed through said thickness of said substantially solid body and through said thickness of said abutment, and
      vii. an annular ridge disposed axially on said end surface of an opposite one of said first and second axial ends, said annular ridge having a generally triangular cross-section in a plane being substantially parallel to a plane of said central axis, whereby a base of said triangular cross-section lies on said end surface of said opposite one of said first and second axial ends;
   (b) at least one rigid member including:
      i. a pair of substantially planar surfaces spaced apart from each other along said central axis to define a thickness of said at least one rigid member, one of said pair of substantially planar surfaces abuttingly engaging said end surface of one of said first and second axial ends, ii. a central aperture formed through a thickness of said at least one rigid member, said central aperture is so sized that said axial abutment is received operatively therewithin, wherein a distal end of said axial abutment extends a predetermined distance beyond an opposite one of said pair of substantially planar surfaces of said rigid member, iii. a plurality of projections upstanding in a predetermined pattern on said one of said pair of substantially planar surfaces of said at least one rigid member, iv. a plurality of apertures formed through said thickness of said at least one rigid member and said projections and defining ring shaped projections; and (c) means for securing said compressible elastomeric pad to said at least one rigid member, said securing means including:

i. an annular lip disposed on said distal end of said axial abutment in a plane being substantially transverse to said central axis, ii. an annular thickness portion of said at least one rigid member being caged between said one of said end surfaces of said one of said first and second axial ends of said compressible elastomeric pad and an inner surface of said annular lip, and iii. penetration by each of said plurality of ring shaped projections of said at least one rigid member into said thickness of said compressible elastomeric body.

7. The compressible spring, according to claim 6, wherein said at least one rigid member includes additional plurality of projections upstanding in a predetermined pattern on an opposite one of said pair of substantially planar surfaces of said at least one rigid member and further includes additional plurality of apertures formed through said thickness of said at least one rigid member and said additional plurality of projections and defining an additional plurality of ring shaped projections.

8. The compressible spring, according to claim 6, wherein at least fifteen percent of a length of said axial bore has a substantially uniform diameter throughout.

9. The compressible spring, according to claim 6, wherein said caged annular thickness portion is disposed in a same plane as a remaining thickness portion of said at least one rigid member.

10. A compressible spring comprising:

(a) a plurality of elastomeric pads disposed in series with each other along a longitudinal axis of said spring;

(b) a plurality of plate shaped members, each of said plurality of plate shaped members inserted between a pair of adjacently disposed elastomeric pads so that one surface of said each of said plurality of plate shaped members is positioned in direct contact with an end surface of each of said pair of adjacently disposed elastomeric pads;

(c) a central aperture formed through a thickness of said each of said plurality of plate shaped members;

(d) an axial abutment upstanding on one end surface of said each of plurality of elastomeric pads and sized to pass through a respectively positioned central aperture; and (e) a peripheral lip disposed on a distal end of said axial abutment in a plane being substantially transverse to said longitudinal axis and caging a thickness portion around said central aperture, wherein at least one of said plurality of plate shaped members includes a peripheral flange, said flange having a first portion and a second portion tapering inwardly toward said longitudinal axis.

\* \* \* \* \*